J. S. MYERS.

WAGON HAYRACK CARRIAGE.

APPLICATION FILED MAR. 1, 1921.

Reissued July 19, 1921.

15,158.

2 SHEETS—SHEET 1.

Jacob S. Myers INVENTOR

BY Victor J. Evans ATTORNEY

R. A. Thomas

Thomas E. Turpin

WITNESSES

J. S. MYERS.

WAGON HAYRACK CARRIAGE.

APPLICATION FILED MAR. 1, 1921.

Reissued July 19, 1921.

15,158.

2 SHEETS—SHEET 2.

R. A. Thomas

Thomas E. Turpin

WITNESSES

Jacob S. Myers INVENTOR

BY Victor J. Evans

ATTORNEY

UNITED STATES PATENT OFFICE.

JACOB S. MYERS, OF HAGERSTOWN, MARYLAND, ASSIGNOR TO WARREN MURRAY BAECHTEL AND JOSEPH K. HOFFMAN, BOTH OF HAGERSTOWN, MARYLAND.

WAGON-HAYRACK CARRIAGE.

15,158. Specification of Reissued Letters Patent. Reissued July 19, 1921.

Original No. 1,296,207, dated March 4, 1919, Serial No. 211,361, filed January 11, 1918. Application for reissue filed March 1, 1921. Serial No. 448,850.

*To all whom it may concern:*

Be it known that I, JACOB S. MYERS, a citizen of the United States, residing at Hagerstown, in the county of Washington and State of Maryland, have invented certain new and useful Improvements in Wagon-Hayrack Carriages, of which the following is a specification, reference being had therein to the accompanying drawing.

This invention relates to wagon hay-racks and particularly to wagon hay-racks of that type provided with means for facilitating the loading thereof by means of a hay loader.

The primary object of the invention is to provide a novel construction of loading carriage for receiving and conveying the initial portion of the load forward upon the hay-rack, thus doing away with the hard labor customarily employed for this operation, and which is so constructed as to be easily and conveniently operated from the hay-rack.

A further object of the invention is to provide a loading carriage which lies close to the bed of the hay-rack and occupies as small a space as possible, which will effectually sustain and distribute the weight of the load, and which is guided and held securely against tilting or lateral displacement.

A further object is to provide a loading carriage constructed and arranged to be adjusted or changed as to height and as to width to adapt it for application to wagon racks varying in width and to wagon racks varying in depth.

With these and other objects in view, the invention consists of the features of construction, combination and arrangement of parts, hereinafter fully described and claimed, reference being had to the accompanying drawings, in which:—

Fig. 3 is an enlarged front end elevation of the wagon-rack and carriage as shown in Figs. 1 and 2.

Figures 1, 2, 5, 6:
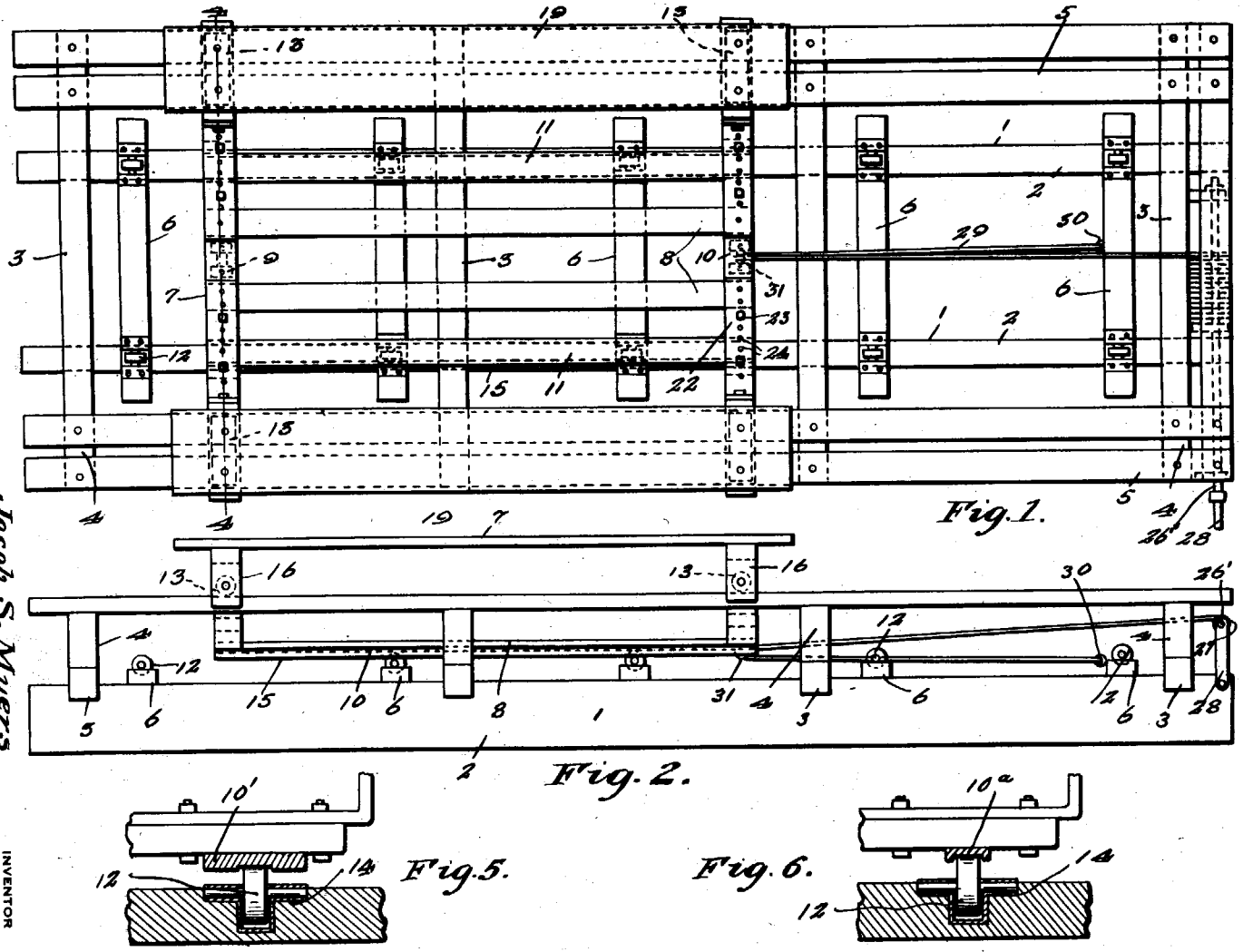
Figure 1 is a top plan view of the wagon hay-rack and the loading carriage thereon.
Fig. 2 is a side elevation of the same.
Figs. 5 and 6 are detail views showing slight modifications.
Figures 4, 5:
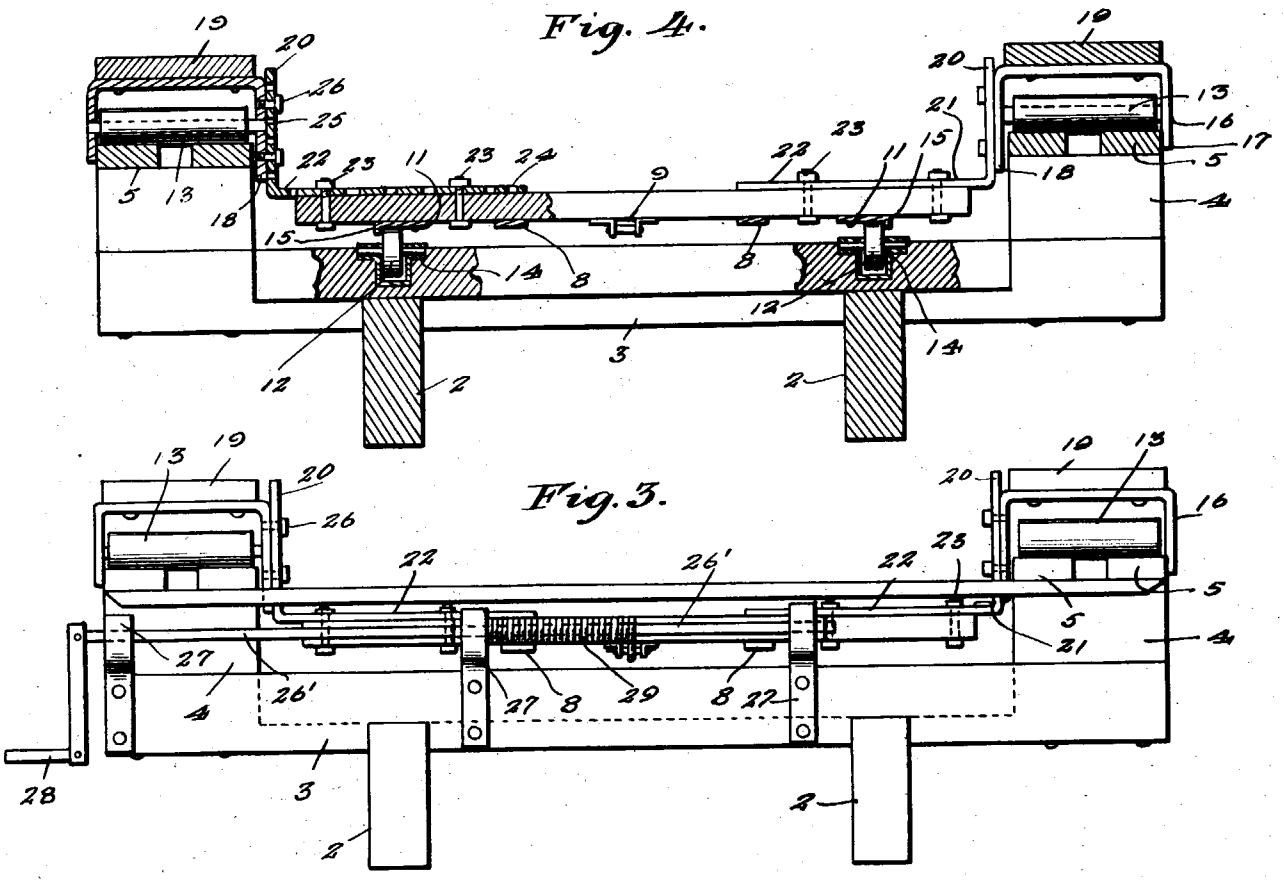
Fig. 4 is an enlarged transverse section on the plane indicated by the line 4—4 of Fig. 1.

Referring now more particularly to the drawings, 1 designates a wagon hay-rack which may be, with the exceptions hereinafter noted, of ordinary general construction, and mounted upon any suitable type of running gear, as commonly used in hay wagons. This rack, which may be provided or not with a ladder or upright, comprises a pair of longitudinal beams 2 connected at spaced intervals by transverse main beams 3. These main beams 3, as shown, carry sill blocks 4 upon which are mounted sill bars or boards 5, forming side guards and the rails of a track arranged above the level of the bed of the rack frame, formed by the beams 2 and the cross bars 3. The boards 5 are mounted upon end extensions of the beams 3 which project laterally beyond the beams 2, and secured to the beams 2 are shorter cross bars 6 of less length than the beams 3 and projecting across the rack a distance equivalent to the distance between opposing sill blocks.

Mounted for travel upon the track rails 5 is a loading carriage 7 comprising a pair of central or main longitudinal bars 8 and cross bars 9 and 10 suitably secured together, the carriage also having longitudinal bars 11 connected with the ends of the bars 9 and 10 at the outer sides of the bars 8, said bars 11 being arranged between the bars 8 and the ends of the bars 9 and 10.

The carriage 7 is mounted for travel upon the track rails 5 from end to end of the truck frame 1, and to this end are arranged for travel upon suitable rollers 12 and 13. The rollers 12 are carried by axles journaled in bearings 14 countersunk in the bars 6, and are engaged by the bars 11 which rest thereon and form shoes or rails upon the carriage, whereby the body of the carriage is mounted for rolling travel over the bed of the rack frame. The bars 11 are preferably made of metal and are provided at their outer longitudinal edges with down-turned flanges 15 for engagement with the rollers to hold the carriage from sidewise movement and to cause it to travel always in a direct longitudinal line.

The rollers 13 are mounted upon axles journaled in the depending arms of inverted U-shaped bearing brackets 16, arranged in pairs beyond opposite sides of the carriage for travel upon the respective rails 5. The arms of these brackets 16 project downwardly at the sides of the track rails 5 in the form of extensions 17 and 18 which run in guided engagement with the side edges of the track rails and hold the brackets and rollers from sidewise or lateral movement. Secured to the upper cross piece of the U-shaped brackets 16 are horizontal longitudinal side boards 19, arranged, with the roller bearing brackets, beyond the sides of the rack bed and above the level thereof, whereby side guards are formed to support the sides of the load of hay to hold the same securely upon the rack and carriage against any possibility of lateral displacement.

The roller bearing brackets 16 are carried by the upright arms 20 of L-shaped bracket irons 21, the horizontal arms 22 of which rest upon the upper surfaces of the cross bars 9 and 10 of the carriage and are secured thereto by spaced bolts 23. The bolts 23 are adapted to pass through certain apertures of a series of apertures 24 in the arms 22, whereby the bracket irons are adjustably secured to the bars 9 and 10 for spacing the roller bearing brackets 16 a greater or less distance apart, and thereby adapting the loading carriage for application to wagon racks varying in width. The vertical arms 20 of the bracket irons are also provided with series of apertures 25 for the passage of screws or bolts 26 adjustably securing the roller brackets 16 thereto, whereby the brackets may be disposed at different elevations according to the height or level of the track surfaces 5 above the bed of the hay wagon rack, provision thus being made for mounting the carriage upon hay wagon racks, varying to some considerable extent in size. It will be observed from the foregoing description that the beds of the wagon hay-rack and of the carriage body properly lie in close proximity to each other and below the level of the track rails and the roller bearings 13, whereby a construction is secured adapting the carriage to lie at a comparatively low level and to occupy but a small amount of space, the arrangement being also such that the bottom of the load weight of hay will rest in a cradle and be supported by the track rails and held by the sides of the loading carriage against lateral displacement, it being understood that uprights may also be employed to assist in retaining the load of hay in position. Furthermore, it will be seen that the total weight of the load will not rest upon any single series of roller bearings, but will be distributed between the sets of bearings, thus enabling the carriage to be moved with ease and facility and the load to be supported upon the structure in a suitable manner.

In the use of the device, it will be understood that the carriage is initially arranged at one end, usually the rear end of the wagon rack bed to receive a portion of the load from the loader, the carriage then being moved to the opposite end of the wagon rack bed to convey this portion of the load to that point, leaving the end of the wagon rack bed exposed or open to receive the remainder of the load from the loader. By this means the portion of the hay usually pitched from the rear to the forward end of the wagon hay-rack by hand may be initially received from the loader directly upon the carriage and transported to the front end of the wagon hay-rack, whereupon the rear end of the wagon hay-rack may also be filled directly from the loader, thus doing away with the hand labor in loading customarily employed and at the same time facilitating and expediting the loading operation. In unloading the reverse action may take place, that is to say, the hay may first be unloaded from the rear end of the hay wagon rack and the carriage then moved rearwardly and the hay dumped or otherwise unloaded therefrom, thus facilitating the operation of unloading. The advantages of my invention will accordingly be apparent from the foregoing description.

For the purpose of moving the carriage forward and backward, any suitable type of operating mechanism may be employed. In the present instance I have shown a windlass at the front of the wagon rack bed for moving the carriage forwardly, such windlass comprising a winding shaft 26′ journaled in bearings 27 and having at one end an operative crank 28. A rope or cable 29 is wound at one end about said shaft, secured at its opposite end to the forward end of the wagon rack frame, as at 30, and passed around a pulley 31 on the forward cross bar 10 of the carriage, whereby the cable may be wound and unwound in an obvious manner to pull the carriage forward and to permit it to travel backward.

It will be observed that my invention provides a movable loading carriage which not only facilitates the operations of loading and unloading, but which provides for the reception and supporting of the weight of the hay and the distribution of its load weight in a reliable and effective manner, and that, as the weight of the load is distributed between the roller bearings, an easy running motion of the carriage will be secured and binding thereof effectually prevented.

In Fig. 5 I have shown a slight modification in which grooved wooden bars 10′ are provided in lieu of the bars 11, and in Fig. 6 another slight modification is shown in which channeled metal bars 10ª are provided in lieu of the bars 11.

Having thus fully described my invention, I claim:—

1. A carriage adapted for movement endwise of a wagon rack bed having elevated side rails forming a track and also having rollers below the level of the track; the said carriage being capable of movement endwise of a rack bed below the level of the rails, and including in its construction upright lapped portions adjustably connected together, whereby the carriage may be increased and diminished in depth, and also including in its construction portions arranged to overhang the elevated side rails and equipped with rollers to travel on said rails.

2. A carriage adapted for movement endwise of a wagon rack bed having elevated side rails forming a track and also having rollers below the level of the track; the said carriage being capable of movement endwise of a rack bed below the level of the rails, and including in its construction upright lapped portions adjustably connected together, whereby the carriage may be increased and diminished in depth, and also including in its construction horizontal transverse lapped portions adjustably connected together, whereby the carriage may be increased and diminished in width, and portions arranged to overhang the elevated rails and equipped with rollers to travel on said rails.

3. A carriage adapted for movement endwise of a wagon rack bed having elevated side rails forming a track and also having rollers below the level of the track; the said carriage being capable of movement endwise of a rack bed below the level of the rails and being provided with rails to rest and travel upon said rollers and being also provided at its sides with hanger brackets having spaced portions and adapted to overhang the track rails of the track bed, with transverse rollers carried between the said spaced portions of the brackets to travel upon said track rails, and with supporting connections between said hangers and the carriage, said connections being adjustably connected with the carriage and with said brackets.

In testimony whereof I hereunto affix my signature, this 25th day of February, 1921.

JACOB S. MYERS.